United States Patent
Zhang et al.

(10) Patent No.: US 11,310,767 B2
(45) Date of Patent: Apr. 19, 2022

(54) PAGING MESSAGE TRANSMISSION METHOD AND APPARATUS

(71) Applicant: HUAWEI TECHNOLOGIES CO., LTD., Guangdong (CN)

(72) Inventors: Xiangdong Zhang, Shenzhen (CN); Junren Chang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/015,438

(22) Filed: Sep. 9, 2020

(65) Prior Publication Data

US 2020/0404619 A1 Dec. 24, 2020

Related U.S. Application Data

(63) Continuation of application No. PCT/CN2019/078154, filed on Mar. 14, 2019.

(30) Foreign Application Priority Data

Mar. 31, 2018 (CN) .......................... 201810278571.X

(51) Int. Cl.
*H04W 68/02* (2009.01)
*H04B 7/06* (2006.01)
*H04W 24/10* (2009.01)
*H04W 72/04* (2009.01)

(52) U.S. Cl.
CPC .......... *H04W 68/02* (2013.01); *H04B 7/0632* (2013.01); *H04W 24/10* (2013.01); *H04W 72/046* (2013.01)

(58) Field of Classification Search
CPC ..... H04W 68/00; H04W 68/02; H04W 24/10; H04W 72/046; H04B 7/0632; H04B 7/0695; H04B 7/088
See application file for complete search history.

(56) References Cited

U.S. PATENT DOCUMENTS 10,595,271 B2 * 3/2020 Jung .................... H04B 7/0617
2010/0061286 A1 3/2010 Ji et al.
(Continued)

FOREIGN PATENT DOCUMENTS

CN 104205911 A 12/2014
CN 107135021 A 9/2017
(Continued)

OTHER PUBLICATIONS

Huawei et al.,"Definition of Paging Occasion",3GPP TSG-RAN WG2 #101 R2-1803644,Athens, Greece, Feb. 26-Mar. 2, 2018,total 6 pages.
(Continued)

*Primary Examiner* — Siu M Lee
(74) *Attorney, Agent, or Firm* — Womble Bond Dickinson (US) LLP

(57) ABSTRACT

This application provides a paging message transmission method and relates to the field of communications technologies, to resolve a problem of waste of a downlink time-frequency resource. The method includes: determining, by a network device, that a communications device is in a beam update mode; then determining, by the network device, a second beam based on beam information reported by the communications device, where the beam information includes information about at least one receive beam, and the information about the at least one receive beam includes information about the second beam; and finally sending, by the network device, a paging message to the communications device over a first beam, where the first beam corresponds to the second beam. This application is applicable to a paging message transmission process.

18 Claims, 7 Drawing Sheets

(56) References Cited

U.S. PATENT DOCUMENTS

| | | | |
|---|---|---|---|
| 2014/0004898 | A1 | 1/2014 | Yu et al. |
| 2017/0366236 | A1* | 12/2017 | Ryoo .................. H04B 7/0421 |
| 2017/0367069 | A1 | 12/2017 | Agiwal et al. |
| 2019/0208498 | A1* | 7/2019 | Moriwaki ........... H04W 68/005 |
| 2021/0067228 | A1* | 3/2021 | Liu ..................... H04W 68/005 |

FOREIGN PATENT DOCUMENTS

| | | |
|---|---|---|
| CN | 107211299 A | 9/2017 |
| CN | 107534480 A | 1/2018 |
| WO | 2017217758 A1 | 12/2017 |

OTHER PUBLICATIONS

InterDigital, Inc.,"Overhead reduction techniques for NR paging based on beam sweeping",3GPP TSG RAN WG 1 Meeting#91 R1-1720549,Reno, U.S.A, Nov. 27-Dec. 1, 2017,total 6 pages.

Huawei et al.,"Paging mechanism in NR",3GPP TSG-RAN WG2#97 R2-1701794,Athens, Greece, Feb. 13-17, 2017,total 4 pages.

Zte et al. Paging design, 3GPP TSG RAN WG1 Meeting #91, R1-1719344, Reno, USA, Nov. 27-Dec. 1, 2017, total 11 pages.

Vivo:"Remaining details on NR paging design", 3GPP TSG RAN WG1 Meeting #90bis, R1-1717462, Prague, Czech Republic, Oct. 9-13, 2017, total 5 pages.

MediaTek Inc.:"Overhead Reduction for Paging in Multi-beam Operation", 3GPP TSG-RAN WG2 Meeting #101, R2-1801955, Athens, Greece, Feb. 26-Mar. 2, 2018, total 5 pages.

3GPP TS 38.331 V15.0 0 (Dec. 2017), 3rd Generation Partnership Project; Technical Specification Group Radio Access Network NR Radio Resource Control (RRC) protocol specification (Release 15), Dec. 2017. total 188 pages.

Nokia et al. Paging in NR at HF operation, 3GPP TSG-RAN WG2 NR #97, R2-1700807, Athens, Greece, Feb. 13-17, 2017, total 6 pages.

* cited by examiner

PAGING MESSAGE TRANSMISSION METHOD AND APPARATUS

CROSS-REFERENCE TO RELATED APPLICATIONS

This application is a continuation of International Application No. PCT/CN2019/078154, filed on Mar. 14, 2019, which claims priority to Chinese Patent Application No. 201810278571.X, filed on Mar. 31, 2018. The disclosures of the aforementioned applications are hereby incorporated by reference in their entireties.

TECHNICAL FIELD

This application relates to the field of communications technologies, and in particular, to a paging message transmission method and an apparatus.

BACKGROUND

Compared with a long term evolution (LTE) communications system, a 5th generation (5G) communications system uses a higher carrier frequency to implement wireless communication with larger bandwidth and a higher transmission rate. A high-frequency signal has a relatively short wavelength and poor penetration through a blocking object, and is prone to be blocked by an obstruction in a transmission process. Therefore, the high-frequency signal attenuates relatively fast and has a relatively large path loss in the transmission process. Therefore, the 5G communications system uses a beamforming (BF) technology to obtain a beam with good directivity, to increase power in a transmit direction and increase a signal to interference plus noise ratio (SINR) at a receive end.

Currently, in a paging process, a network device cannot learn of a coverage area of which beam a communications device currently resides in. Therefore, to ensure that the communications device can receive a paging message, the network device sends the paging message to the communications device in a beam sweeping manner. In other words, the network device sends the paging message to the communications device over beams of different directions. For example, the network device has five beams with different directionalities. The network device first sends the paging message to the communications device over a beam 1; if the communications device fails to be paged, the network device then sends the paging message to the communications device over a beam 2; and so on. Finally, the network device sends the paging message to the communications device over a beam 5. It can be learned that the foregoing solution results in a problem of waste of a downlink time-frequency resource.

SUMMARY

This application provides a paging message transmission method and an apparatus, to resolve a problem of waste of a downlink time-frequency resource.

To achieve the foregoing objective, the following technical solutions are used in this application:

According to a first aspect, this application provides a paging message transmission method. The method includes: determining, by a network device, that a communications device is in a beam update mode; then determining, by the network device, a second beam based on beam information, where the beam information is reported by the communications device, the beam information includes information about at least one receive beam, and the information about the at least one receive beam includes information about the second beam; and sending, by the network device, a paging message to the communications device over a first beam, where the first beam corresponds to the second beam. Based on this technical solution, when determining that the communications device is in the beam update mode, the network device sends, based on the beam information reported by the communications device, the paging message to the communications device over a proper beam (namely, the first beam). In this way, the network device is prevented from sending the paging message to the communications device in a beam sweeping manner, thereby reducing use of a downlink time-frequency resource and avoiding waste of the downlink time-frequency resource.

In one embodiment, after the determining, by the network device, a second beam based on beam information, the method further includes: determining, by the network device, the first beam based on pre-stored beam pair information, where the beam pair information includes a correspondence between a transmit beam of the network device and a receive beam of the communications device. Based on the foregoing method, the network device can determine the first beam.

In one embodiment, the determining, by a network device, that a communications device is in a beam update mode includes: determining, by the network device when a fifth preset condition is met, that the communications device is in the beam update mode. In this way, the network device does not page the communications device in a beam sweeping mode, thereby avoiding waste of a downlink time-frequency resource.

In one embodiment, the fifth preset condition includes at least one or any combination of the following:

(5-1) the network device has stored the beam information of the communications device;

(5-2) the network device determines that a timer has not expired, where the timer is used to indicate a validity period in which the communications device is in the beam update mode;

(5-3) the network device has received the beam information sent by the communications device;

(5-4) the network device has received a first request message sent by the communications device, where the first request message is used to request to enable the beam update mode;

(5-5) the network device has not received a second request message sent by the communications device, where the second request message is used to request to exit the beam update mode;

(5-6) the network device has not sent a second indication message to the communications device, where the second indication message is used to instruct the communications device to exit the beam update mode;

(5-7) the network device has not received a third request message sent by the communications device, where the third request message is used to request the network device to enable the beam sweeping mode; and/or (5-8) the network device has not sent a third indication message to the communications device, where the third indication message is used to notify the communications device that the network device has enabled the beam sweeping mode.

In one embodiment, after the sending, by the network device, a paging message to the communications device over a first beam, the method further includes: if the network device fails to page the communications device over the first beam, re-sending, by the network device, the paging message to the communications device in the beam sweeping mode. In this way, even if the communications device has moved out of a coverage area of the first beam, the network device can still page the communications device in a timely manner.

In one embodiment, the method further includes: sending, by the network device, the second indication message to the communications device when a third preset condition is met, where the second indication message is used to instruct the communications device to exit the beam update mode. In this way, the network device can make the communications device exit the beam update mode.

In one embodiment, the third preset condition includes at least one or any combination of the following:

(3-1) the network device determines that the communications device executes a low-latency service, where the low-latency service is a service that requires a latency to be lower than a preset value;

(3-2) the network device determines that the timer has expired, where the timer is used to indicate the validity period in which the communications device is in the beam update mode;

(3-3) the network device does not receive, in first preset duration, the beam information reported by the communications device;

(3-4) the network device fails to page the communications device; and/or (3-5) the network device has received the second request message sent by the communications device, where the second request message is used to request to exit the beam update mode.

According to a second aspect, this application provides a paging message transmission method. The method includes: reporting, by a communications device, beam information, where the beam information includes information about at least one receive beam, and the information about the at least one receive beam includes information about a second beam; and receiving, by the communications device, a paging message over the second beam. Based on this technical solution, the communications device reports the beam information, to notify a network device that the communications device receives the paging message over the second beam, that is, notify the network device of a beam coverage area in which the communications device resides. In this way, on one hand, the communications device can successfully receive the paging message over the second beam; on the other hand, the network device is also prevented from sending the paging message to the communications device in a beam sweeping manner, thereby reducing use of a downlink time-frequency resource and avoiding waste of the downlink time-frequency resource.

In one embodiment, before the reporting, by a communications device, beam information, the method further includes: enabling, by the communications device, a beam update mode when a first preset condition is met. The beam update mode is enabled. In this way, the communications device can enable the beam update mode in a scenario to which the beam update mode is applicable.

In one embodiment, the first preset condition includes at least one or any combination of the following:

(1-1) a best receive beam of the communications device does not change within preset duration, where the best receive beam is a receive beam with best received signal quality;

(1-2) frequency at which the best receive beam of the communications device changes is less than or equal to first preset frequency; and/or (1-3) the communications device has received a first indication message sent by the network device, where the first indication message is used to instruct the communications device to enable the beam update mode.

In one embodiment, after the enabling, by the communications device, a beam update mode, the method further includes: exiting, by the communications device, the beam update mode when a second preset condition is met. In this way, the communications device can exit the beam update mode in a scenario to which the beam update mode is not applicable.

In one embodiment, the second preset condition includes at least one or any combination of the following:

(2-1) the communications device executes a low-latency service, where the low-latency service is a service that requires a latency to be lower than a preset value;

(2-2) frequency at which the best receive beam of the communications device changes is greater than or equal to second preset frequency; and/or (2-3) the communications device has received a second indication message sent by the network device, where the second indication message is used to instruct the communications device to exit the beam update mode.

In one embodiment, the reporting, by a communications device, beam information includes: reporting, by the communications device, the beam information to the network device when a fourth preset condition is met. In this way, the network device can obtain the beam information in a timely manner.

In one embodiment, the fourth preset condition includes at least one or any combination of the following:

(4-1) the best receive beam of the communications device has changed; and/or (4-2) the communications device does not report the beam information to the network device within second preset duration.

According to a third aspect, this application provides a paging message transmission method. The method includes: determining, by a network device, that a communications device is in a beam update mode; determining, by the network device, a first beam based on beam information, where the beam information is reported by the communications device, the beam information includes information about at least one transmit beam, and the information about the at least one transmit beam includes information about the first beam; and sending, by the network device, a paging message to the communications device over the first beam. Based on this technical solution, when determining that the communications device is in the beam update mode, the network device sends, based on the beam information reported by the communications device, the paging message to the communications device over a proper beam (namely, the first beam). In this way, the network device is prevented from sending the paging message to the communications device in a beam sweeping manner, thereby reducing use of a downlink time-frequency resource and avoiding waste of the downlink time-frequency resource.

In one embodiment, the determining, by a network device, that a communications device is in a beam update mode includes: determining, by the network device when a fifth preset condition is met, that the communications device is in the beam update mode. In this way, the network device does not page the communications device in a beam sweeping mode, thereby avoiding waste of a downlink time-frequency resource.

In one embodiment, the fifth preset condition includes at least one or any combination of the following:

(5-1) the network device has stored the beam information of the communications device;

(5-2) the network device determines that a timer has not expired, where the timer is used to indicate a validity period in which the communications device is in the beam update mode;

(5-3) the network device has received the beam information sent by the communications device;

(5-4) the network device has received a first request message sent by the communications device, where the first request message is used to request to enable the beam update mode;

(5-5) the network device has not received a second request message sent by the communications device, where the second request message is used to request to exit the beam update mode;

(5-6) the network device has not sent a second indication message to the communications device, where the second indication message is used to instruct the communications device to exit the beam update mode;

(5-7) the network device has not received a third request message sent by the communications device, where the third request message is used to request the network device to enable the beam sweeping mode; and/or (5-8) the network device has not sent a third indication message to the communications device, where the third indication message is used to notify the communications device that the network device has enabled the beam sweeping mode.

In one embodiment, after the sending, by the network device, a paging message to the communications device over the first beam, the method further includes: if the network device fails to page the communications device over the first beam, re-sending, by the network device, the paging message to the communications device in the beam sweeping mode. In this way, even if the communications device has moved out of a coverage area of the first beam, the network device can still page the communications device in a timely manner.

In one embodiment, that the network device fails to page the communications device over the first beam includes: the network device fails to page the communications device after the network device sends the paging message for a preset quantity of times over the first beam, or the network device fails to page the communications device within third preset duration after sending the paging message over the first beam.

In one embodiment, the method further includes: sending, by the network device, the second indication message to the communications device when a third preset condition is met, where the second indication message is used to instruct the communications device to exit the beam update mode. In this way, the network device can make the communications device exit the beam update mode.

In one embodiment, the third preset condition includes at least one or any combination of the following:

(3-1) the network device determines that the communications device executes a low-latency service, where the low-latency service is a service that requires a latency to be lower than a preset value;

(3-2) the network device determines that the timer has expired, where the timer is used to indicate the validity period in which the communications device is in the beam update mode;

(3-3) the network device does not receive, in first preset duration, the beam information reported by the communications device;

(3-4) the network device fails to page the communications device; and/or (3-5) the network device has received the second request message sent by the communications device, where the second request message is used to request to exit the beam update mode.

According to a fourth aspect, this application provides a paging message transmission method. The method includes: reporting, by a communications device, beam information, where the beam information includes information about at least one transmit beam, and the information about the at least one transmit beam includes information about a first beam; and receiving, by the communications device, a paging message over a second beam, where the second beam corresponds to the first beam. Based on this technical solution, the communications device reports the beam information, so that a network device sends the paging message over the first beam. In this way, on one hand, the communications device can successfully receive the paging message over the second beam corresponding to the first beam; on the other hand, the network device is also prevented from sending the paging message to the communications device in a beam sweeping manner, thereby reducing use of a downlink time-frequency resource and avoiding waste of the downlink time-frequency resource.

In one embodiment, before the reporting, by a communications device, beam information, the method further includes: enabling, by the communications device, a beam update mode when a first preset condition is met. In this way, the communications device can enable the beam update mode in a scenario to which the beam update mode is applicable.

In one embodiment, the first preset condition includes at least one or any combination of the following:

(1-1) a best receive beam of the communications device does not change within preset duration, where the best receive beam is a receive beam with best received signal quality;

(1-2) frequency at which the best receive beam of the communications device changes is less than or equal to first preset frequency; and/or (1-3) the communications device has received a first indication message sent by the network device, where the first indication message is used to instruct the communications device to enable the beam update mode.

In one embodiment, after the enabling, by the communications device, a beam update mode, the method further includes: exiting, by the communications device, the beam update mode when a second preset condition is met. In this way, the communications device can exit the beam update mode in a scenario to which the beam update mode is not applicable.

In one embodiment, the second preset condition includes at least one or any combination of the following:

(2-1) the communications device executes a low-latency service, where the low-latency service is a service that requires a latency to be lower than a preset value;

(2-2) frequency at which the best receive beam of the communications device changes is greater than or equal to second preset frequency; and/or (2-3) the communications device has received a second indication message sent by the network device, where the second indication message is used to instruct the communications device to exit the beam update mode.

In one embodiment, the reporting, by a communications device, beam information includes: reporting, by the communications device, the beam information to the network device when a fourth preset condition is met. In this way, the network device can obtain the beam information in a timely manner.

In one embodiment, the fourth preset condition includes at least one or any combination of the following:

(4-1) the best receive beam of the communications device has changed; and/or (4-2) the communications device does not report the beam information to the network device within second preset duration.

According to a fifth aspect, a communications device is provided. The communications device has a function of implementing the method according to either of the first aspect or the third aspect. The function may be implemented by hardware, or may be implemented by hardware executing corresponding software. The hardware or software includes one or more modules corresponding to the foregoing function.

According to a sixth aspect, a communications device is provided, including a processor and a memory. The memory is configured to store a computer executable instruction. When the communications device runs, the processor executes the computer executable instruction stored in the memory, to enable the communications device to perform the paging message transmission method according to either of the first aspect or the third aspect.

According to a seventh aspect, a communications device is provided, including a processor. The processor is configured to be coupled to a memory, and after reading an instruction in the memory, perform the paging message transmission method according to either of the first aspect or the third aspect according to the instruction.

According to an eighth aspect, a computer-readable storage medium is provided. The computer-readable storage medium stores an instruction. When the instruction is run on a computer, the computer is enabled to perform the paging message transmission method according to either of the first aspect or the third aspect.

According to a ninth aspect, a computer program product including an instruction is provided. When the computer program product is run on a computer, the computer is enabled to perform the paging message transmission method according to either of the first aspect or the third aspect.

According to a tenth aspect, a system-on-a-chip is provided. The system-on-a-chip includes a processor, configured to support a communications device in implementing a function in the first aspect or the third aspect. In one embodiment, the system-on-a-chip further includes a memory. The memory is configured to store a program instruction and data necessary for the communications device. The system-on-a-chip may include a chip, or may include a chip and other discrete components.

For technical effects of any design manner in the fifth aspect to the tenth aspect, refer to the technical effects of the different design manners in the first aspect or the third aspect. Details are not described herein again.

According to an eleventh aspect, a network device is provided. The network device has a function of implementing the method according to either of the second aspect or the fourth aspect. The function may be implemented by hardware, or may be implemented by hardware executing corresponding software. The hardware or software includes one or more modules corresponding to the foregoing function.

According to a twelfth aspect, a network device is provided, including a processor and a memory. The memory is configured to store a computer executable instruction. When the network device runs, the processor executes the computer executable instruction stored in the memory, to enable the network device to perform the paging message transmission method according to either of the second aspect or the fourth aspect.

According to a thirteenth aspect, a network device is provided, including a processor. The processor is configured to be coupled to a memory, and after reading an instruction in the memory, perform the paging message transmission method according to either of the second aspect or the fourth aspect according to the instruction.

According to a fourteenth aspect, a computer-readable storage medium is provided. The computer-readable storage medium stores an instruction. When the instruction is run on a computer, the computer is enabled to perform the paging message transmission method according to either of the second aspect or the fourth aspect.

According to a fifteenth aspect, a computer program product including an instruction is provided. When the computer program product is run on a computer, the computer is enabled to perform the paging message transmission method according to either of the second aspect or the fourth aspect.

According to a sixteenth aspect, a system-on-a-chip is provided. The system-on-a-chip includes a processor, configured to support a network device in implementing a function in the second aspect or the fourth aspect. In one embodiment, the system-on-a-chip further includes a memory. The memory is configured to store a program instruction and data necessary for the network device. The system-on-a-chip may include a chip, or may include a chip and other discrete components.

For technical effects of any design manner in the eleventh aspect to the sixteenth aspect, refer to the technical effects of the different design manners in the second aspect or the fourth aspect. Details are not described herein again.

DESCRIPTION OF EMBODIMENTS

Figure 1:
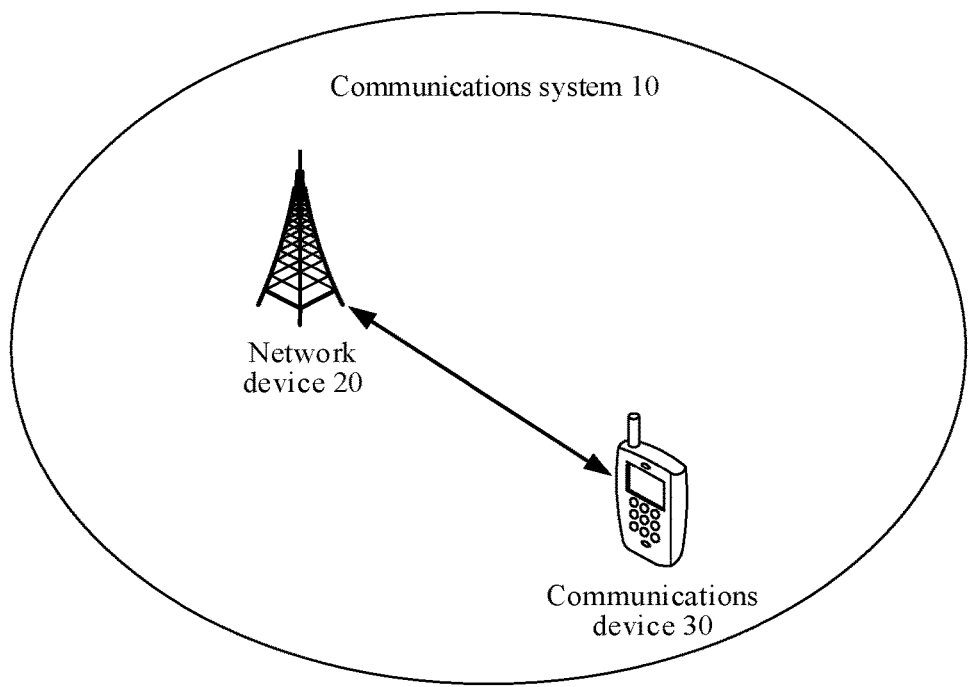
FIG. 1 is a schematic diagram of a communications system according to an embodiment of this application.

Terms such as "first" and "second" in this application are merely intended for distinguishing between different objects, but do not limit a sequence of the objects. For example, a first base station and a second base station are merely intended for distinguishing between different base stations, but do not limit a sequence of the base stations.

The term "and/or" in this application is only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

It should be noted that, in this application, the word "example" or "for example" is used to represent an example, an illustration, or a description. Any embodiment or design described as an "example" or "for example" in this application should not be interpreted as being more preferred or more advantageous than another embodiment or design. Rather, use of the word "example" or "for example" or the like is intended to present a relative concept in a specific manner.

In addition, a network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

To facilitate understanding of the technical solutions of the embodiments of this application, related terms mentioned in this application are first described briefly.

A beam is a communication resource. Beams may be categorized into transmit beams and receive beams. A transmit beam may be understood as a distribution of signal strength formed in different directions in space after a signal is sent through an antenna. A receive beam may be understood as a distribution, of signal strength of a wireless signal received through an antenna, in different directions in space. Different beams may be considered as different resources. Different beams may be used to send same information or different information. One beam may use one or more antenna ports, and is used to transmit data channel information, control channel information, a detection signal, and the like.

A beam pair is based on the concept of beam. One beam pair usually includes one transmit beam of a transmit-end device and one receive beam of a receive-end device. In a downlink direction, the transmit-end device may be a network device, and the receive-end device may be a communications device. In an uplink direction, the transmit-end device may be the communications device, and the receive-end device may be the network device.

A paging message transmission method provided in this application may be applied to various communications systems that use a beamforming technology, for example, a 5G communications system, a future evolved system, or a converged system that uses a plurality of communications standards. The technical solutions provided in this application may be applied to various application scenarios, for example, scenarios such as machine to machine (M2M), macro-micro communication, enhanced mobile internet (eMBB), ultra-reliable and low latency communications (uRLLC), and massive machine type communication (mMTC). These scenarios may include but are not limited to a scenario of communication between communications devices, a scenario of communication between network devices, a scenario of communication between a network device and a communications device, and the like.

FIG. 1 is a schematic diagram of a communications system according to one embodiment to which the technical solutions provided in this application are applicable. The communications system 10 includes a network device 20 and a communications device 30.

The network device 20 may be a base station, a base station controller, or the like for wireless communication. For example, the base station may be a base transceiver station (BTS) in a global system for mobile communications (GSM) or code division multiple access (CDMA), may be a NodeB in wideband code division multiple access (WCDMA), may be an evolved NodeB (eNB or e-NodeB) in LTE, or the like. Alternatively, the base station may be an eNB in an internet of things (IoT) or a narrowband internet of things (NB-IoT). This is not specifically limited in the embodiments of this application. Certainly, the network device 20 may alternatively be a device in another network, for example, may be a network device in a future 5G mobile communications network or a future evolved public land mobile network (PLMN). Specifically, the network device 20 may be a network element in a core network, such as a mobility management entity (MME). This is not specifically limited in the embodiments of this application.

The communications device 30 provides voice and/or data connectivity services to a user, and may be, for example, user equipment (UE), an access terminal, a terminal unit, a terminal station, a mobile station, a mobile console, a remote station, a remote terminal, a mobile device, a wireless communications device, a terminal agent, or a terminal apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a communications device in a future 5G network, or a communications device in a future evolved public land mobile network. This is not limited in the embodiments of this application.

Figure 2:
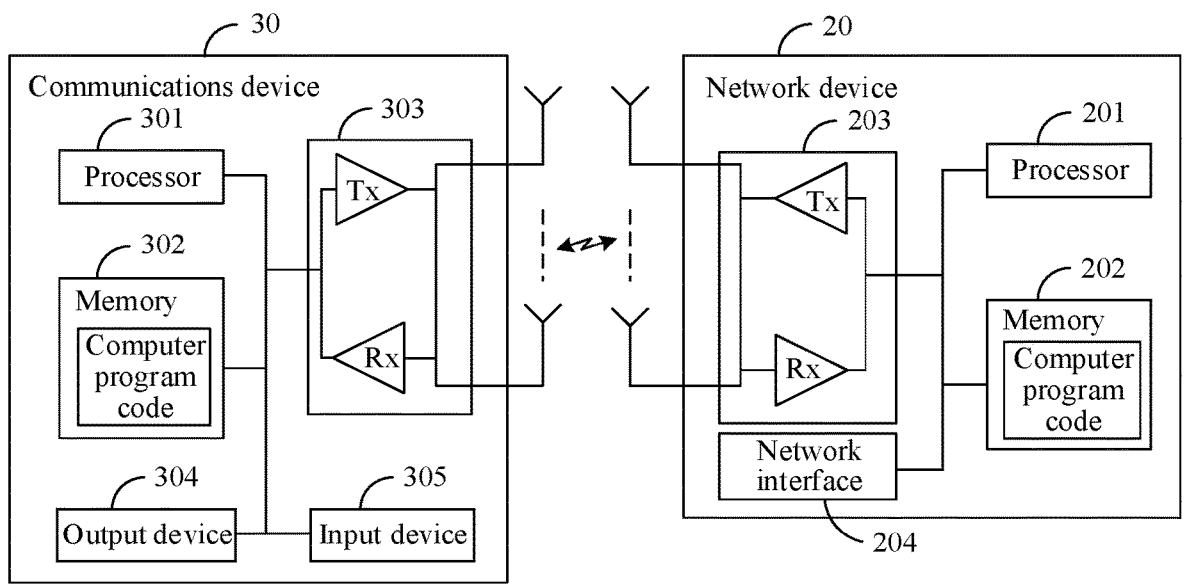
FIG. 2 is a schematic structural diagram of hardware of a network device and a communications device according to an embodiment of this application.

FIG. 2 is a schematic structural diagram of hardware of a network device 20 and a communications device 30 according to an embodiment of this application.

The communications device 30 includes at least one processor 301, at least one memory 302, and at least one transceiver 303. In one embodiment, the communications device 30 may further include an output device 304 and an input device 305.

The processor 301, the memory 302, and the transceiver 303 are connected through a bus. The processor 301 may be a general-purpose central processing unit (CPU), a microprocessor, an application-specific integrated circuit (ASIC), or one or more integrated circuits that are configured to control program execution in the solution of this application. The processor 301 may alternatively include a plurality of CPUs, and the processor 301 may be a single-core (single-CPU) processor or a multi-core (multi-CPU) processor. The processor herein may be one or more devices or circuits, or a processing core configured to process data (such as a computer program instruction).

The memory 302 may be a read-only memory (ROM) or a static storage device of another type that may store static information and an instruction, or a random access memory (RAM) or a dynamic storage device of another type that may store information and an instruction; or may be an electrically erasable programmable read-only memory (EEPROM), a compact disc read-only memory (CD-ROM) or another compact disc memory, an optical disc memory (including a compressed disc, a laser disc, an optical disc, a digital universal disc, a Blu-ray disc, or the like), a magnetic disk storage medium or another magnetic storage device, or any other medium that can be used to carry or store expected program code having an instruction or data structure form and that can be accessed by a computer, without being limited thereto. The memory 302 may exist alone and be connected to the processor 301 through the bus, or the memory 302 may be integrated with the processor 301. The memory 302 is configured to store application program code used to execute the solution of this application, and the processor 301 controls execution of the application program code. The processor 301 is configured to execute computer program code stored in the memory 302, to implement the system message update method in the embodiments of this application.

The transceiver 303 may use any apparatus like a transceiver, and is configured to communicate with another device or communications network, such as an Ethernet, a radio access network (RAN), or a wireless local area network (WLAN). The transceiver 303 includes a transmitter Tx and a receiver Rx.

The output device 304 communicates with the processor 301, and may display information in a plurality of manners. For example, the output device 304 may be a liquid crystal display (LCD), alight emitting diode (LED) display device, a cathode ray tube (CRT) display device, or a projector. The input device 305 communicates with the processor 301, and may receive a user input in a plurality of manners. For example, the input device 305 may be a mouse, a keyboard, a touchscreen device, or a sensing device.

The network device 20 includes at least one processor 201, at least one memory 202, at least one transceiver 203, and at least one network interface 204. The processor 201, the memory 202, the transceiver 203, and the network interface 204 are connected through a bus. The network interface 204 is configured to connect to a core network device through a link (for example, an Si interface), or connect to a network interface of another access network device through a wired or wireless link (for example, an X2 interface) (not illustrated in the figure). This is not specifically limited in the embodiments of this application. In addition, for related descriptions of the processor 201, the memory 202, and the transceiver 203, refer to the descriptions of the processor 301, the memory 302, and the transceiver 303 in the communications device 30. Details are not described herein again.

The following describes in detail a paging message transmission method according to an embodiment of this application with reference to FIG. 1 and FIG. 2.

Figure 3:
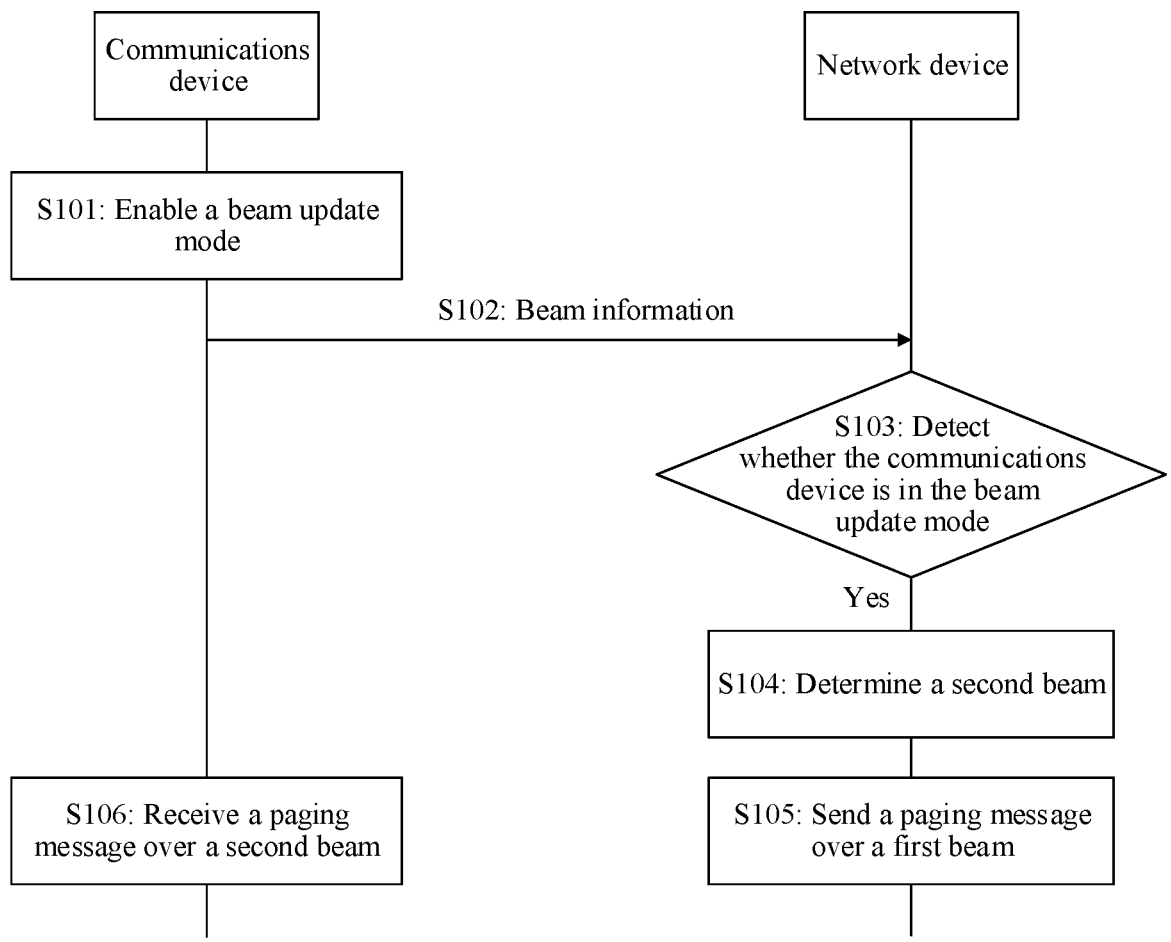
FIG. 3 is a flowchart of a paging message transmission method according to an embodiment of this application.

FIG. 3 shows a paging message transmission method according to an embodiment of this application. The method includes the following operations.

Operation S101: A communications device enables a beam update mode.

The beam update mode is used to enable the communications device to report beam information to a network device.

In one embodiment, the beam update mode is also referred to as a non-beam sweeping mode. This is not limited in any manner in this embodiment of this application.

In an optional implementation, the communications device enables the beam update mode when a first preset condition is met.

In one embodiment, the first preset condition includes at least one or any combination of the following:

(1-1) a best receive beam of the communications device does not change within preset duration, where the best receive beam is a receive beam with best received signal quality;

(1-2) frequency at which the best receive beam of the communications device changes is less than or equal to first preset frequency; and (1-3) the communications device has received a first indication message sent by the network device, where the first indication message is used to instruct the communications device to enable the beam update mode.

Certainly, the first preset condition further includes other implementations. This is not limited in any manner in this embodiment of this application.

The following describes, by way of example, cases in which the first preset condition is implemented by combining the foregoing conditions (1-1), (1-2), and (1-3) and another implementation.

For example, after determining that the best receive beam of the communications device does not change within the preset duration, the communications device sends a first request message to the network device, where the first request message is used to request to enable the beam update mode. Then, if the communications device receives the first indication message sent by the network device, the communications device can determine that the first preset condition is met. In this case, the communications device enables the beam update mode.

For another example, when the frequency at which the best receive beam of the communications device changes is less than or equal to the first preset frequency, the communications device sends a first request message to the network device. Then, if the communications device receives the first indication message sent by the network device, the communications device can determine that the first preset condition is met. In this case, the communications device enables the beam update mode.

It is noteworthy that after enabling the beam update mode, the communications device exits the beam update mode when a second preset condition is met.

In one embodiment, the second preset condition includes at least one or any combination of the following:

(2-1) the communications device executes a low-latency service, where the low-latency service is a service that requires a latency to be lower than a preset value; for example, the low-latency service is a voice service, or the low-latency service is a service in an internet of vehicles scenario;

(2-2) frequency at which the best receive beam of the communications device changes is greater than or equal to second preset frequency; and (2-3) the communications device has received a second indication message sent by the network device, where the second indication message is used to instruct the communications device to exit the beam update mode.

Certainly, the second preset condition further includes other implementations. This is not limited in any manner in this embodiment of this application.

The following describes, by way of example, cases in which the second preset condition is implemented by combining the foregoing condition (2-1), (2-2), and (2-3) and another implementation.

For example, when executing a low-latency service, the communications device sends a second request message to the network device, where the second request message is used to request to exit the beam update mode. Then, if the communications device receives the second indication message sent by the network device, the communications device determines that the second preset condition is met. In this case, the communications device exits the beam update mode.

For another example, when the frequency at which the best receive beam of the communications device changes is greater than or equal to the second preset frequency, the communications device sends a second request message to the network device. Then, if the communications device receives the second indication message sent by the network device, the communications device determines that the second preset condition is met. In this case, the communications device exits the beam update mode.

It is noteworthy that the network device sends the second indication message to the communications device only when a third preset condition is met.

In one embodiment, the third preset condition includes at least one or any combination of the following:

(3-1) the network device determines that the communications device executes a low-latency service;

(3-2) the network device determines that a timer has expired, where the timer is used to indicate a validity period in which the communications device is in the beam update mode;

(3-3) the network device does not receive, in first preset duration, the beam information reported by the communications device;

(3-4) the network device fails to page the communications device; and (3-5) the network device has received the second request message sent by the communications device.

Certainly, the third preset condition further includes other implementations. This is not limited in any manner in this embodiment of this application.

Operation S102: The communications device reports the beam information.

The beam information includes information about at least one receive beam, and the information about the at least one receive beam includes information about a second beam.

In this embodiment, the information about the receive beam is used to indicate a receive beam of the communications device. The information about the receive beam includes at least one of the following information: an index of the receive beam (for example, a logical number or a physical number of the receive beam), beam pair link (BPL) information, an index of a synchronization signal block (SSB), and the like.

In one embodiment, after enabling the beam update mode, the communications device sends the beam information to the network device when a fourth preset condition is met. It is noteworthy that after receiving the beam information sent by the communications device, the network device stores the beam information in the network device, or stores the beam information in context information that corresponds to the communications device.

In one embodiment, the fourth preset condition includes at least one of the following conditions:

(4-1) the best receive beam of the communications device has changed; and (4-2) the communications device does not report the beam information to the network device within second preset duration.

Certainly, the fourth preset condition further includes other implementations. This is not limited in any manner in this embodiment of this application.

It is noteworthy that a premise for the communications device to report the beam information is that the communications device has generated the beam information. The communications device may generate the beam information by using the following method:

The communications device detects received signal quality of each receive beam, and then the communications device generates the beam information based on information about a receive beam that meets a preset rule.

It can be understood that the received signal quality of a receive beam is quality of a signal received by the communications device over the receive beam.

In one embodiment, the preset rule includes the following: Received signal quality of the receive beam is greater than a preset value, or the receive beam is ranked among top n beams in terms of received signal quality, where n is a natural number. The preset rule may be alternatively implemented in another manner. This is not limited in any manner in this embodiment of this application.

Certainly, the communications device may alternatively generate the beam information by using another method. This is not limited in any manner in this embodiment of this application.

Operation S103: The network device detects whether the communications device is in the beam update mode.

In an embodiment, the network device detects whether a fifth preset condition is met. When the fifth preset condition is met, the network device determines that the communications device is in the beam update mode. When the network device does not meet the fifth preset condition, the network device determines that the communications device is not in the beam update mode.

In one embodiment, the fifth preset condition includes at least one or any combination of the following:

(5-1) the network device has stored the beam information of the communications device;

(5-2) the network device determines that the timer has not expired, where the timer is used to indicate the validity period in which the communications device is in the beam update mode, and in one embodiment, when the network device receives the beam information of the communications device, the network device resets the timer;

(5-3) the network device has received the beam information sent by the communications device;

(5-4) the network device has received the first request message sent by the communications device;

(5-5) the network device has not received the second request message sent by the communications device;

(5-6) the network device has not sent the second indication message to the communications device;

(5-7) the network device has not received a third request message sent by the communications device, where the third request message is used to request the network device to enable a beam sweeping mode, and it can be understood that after the network device enables the beam sweeping mode for the communications device, the network device sends a paging message to the communications device in the beam sweeping mode; and (5-8) the network device has not sent a third indication message to the communications device, where the third indication message is used to notify the communications device that the network device has enabled the beam sweeping mode.

Certainly, the fifth preset condition further includes other implementations. This is not limited in any manner in this embodiment of this application.

The following describes, by way of example, cases in which the fifth preset condition is implemented by freely combining the foregoing conditions (5-1) to (5-8) and another implementation.

For example, when the network device has stored the beam information of the communications device and the timer has not expired, the network device determines that the communications device is in the beam update mode.

For another example, when the network device has stored the beam information of the communications device and the network device has not received the second request message sent by the communications device, the network device determines that the communications device is in the beam update mode.

It is noteworthy that in a process in which the network device sends the paging message to the communications device, if the network device determines that the communications device is not in the beam update mode, the network device sends the paging message to the communications device in the beam sweeping manner. If the network device determines that the communications device is in the beam update mode, the network device performs the following operations S104 and S105.

Operation S104: The network device determines the second beam based on the beam information.

In an embodiment, the network device determines the second beam based on the beam information by using a preset method.

It is noteworthy that the preset method is used by both the network device and the communications device. In other words, the communications device also determines the second beam by using the preset method.

For example, the communications device and the network device select a receive beam with best received signal quality in the beam information as the second beam.

The following describes, in combination with specific application scenarios, how the network device and the communications device determine the second beam.

Scenario 1: The beam information includes the information about the at least one receive beam and received signal quality of the at least one receive beam. In this case, the network device determines the second beam based on information about a receive beam with best received signal quality. Likewise, the communications device compares the received signal quality of the plurality of receive beams, and determines the second beam based on the information about the receive beam with best received signal quality.

Scenario 2: The beam information includes the information about the at least one receive beam and a priority of the at least one receive beam. In this case, the network device determines the second beam based on information about a receive beam with a highest priority. Likewise, the communications device determines the second beam based on the information about the receive beam with the highest priority.

In one embodiment, the priority is determined based on received signal quality of the receive beam, and a receive beam with a higher priority has better received signal quality.

Certainly, determining the second beam by the network device and the communications device may be alternatively implemented in another manner. This is not limited in any manner in this embodiment of this application.

Operation S105: The network device sends the paging message to the communications device over a first beam.

The first beam and the second beam belong to a same beam pair. In other words, the first beam corresponds to the second beam. It can be understood that the first beam is a transmit beam used by the network device in a process of sending the paging message.

In an embodiment, after determining the second beam, the network device determines the first beam based on pre-stored beam pair information. The beam pair information includes a correspondence between a transmit beam of the network device and a receive beam of the communications device. In one embodiment, the beam pair information is determined by the network device in a beam alignment process. Then the network device sends the paging message to the communications device over the first beam.

Specifically, when the network device is a base station, the base station sends the paging message to the communications device over the first beam. Alternatively, when the network device is an MME, the MME sends the paging message and information about the first beam to a base station, so that the base station forwards the paging message to the communications device over the first beam.

It is noteworthy that if the network device fails to page the communications device over the first beam, the network device re-sends the paging message to the communications device in the beam sweeping mode.

In one embodiment, in the following two cases, it is considered that the network device fails to page the communications device over the first beam:

Case 1: After the network device sends the paging message for a preset quantity of times over the first beam, the network device fails to page the communications device.

Case 2: After sending the paging message over the first beam, the network device fails to page the communications device within third preset duration.

Operation S106: The communications device receives the paging message over the second beam.

It can be understood that the second beam is a receive beam used by the communications device in a process of receiving the paging message.

In one embodiment, when the concept of beam pair is not considered, the first beam and the second beam may be collectively referred to as a downlink beam. Therefore, the foregoing operation S105 is equivalent to that "the network device sends the paging message to the communications device over the downlink beam". The foregoing operation S106 is equivalent to that "the communications device receives the paging message over the downlink beam". However, when the concept of beam pair is considered, for the network device, the foregoing downlink beam is the first beam; and for the communications device, the foregoing downlink beam is the second beam.

The actions in the foregoing operations S101, S102, and S106 may be performed by the processor 301 in the communications device 30 shown in FIG. 2 by calling the application program code stored in the memory 302; and the actions in the foregoing operations S103 to S105 may be performed by the processor 201 in the network device 20 shown in FIG. 2 by calling the application program code stored in the memory 202. This is not limited in any manner in this embodiment of this application.

Figure 4:
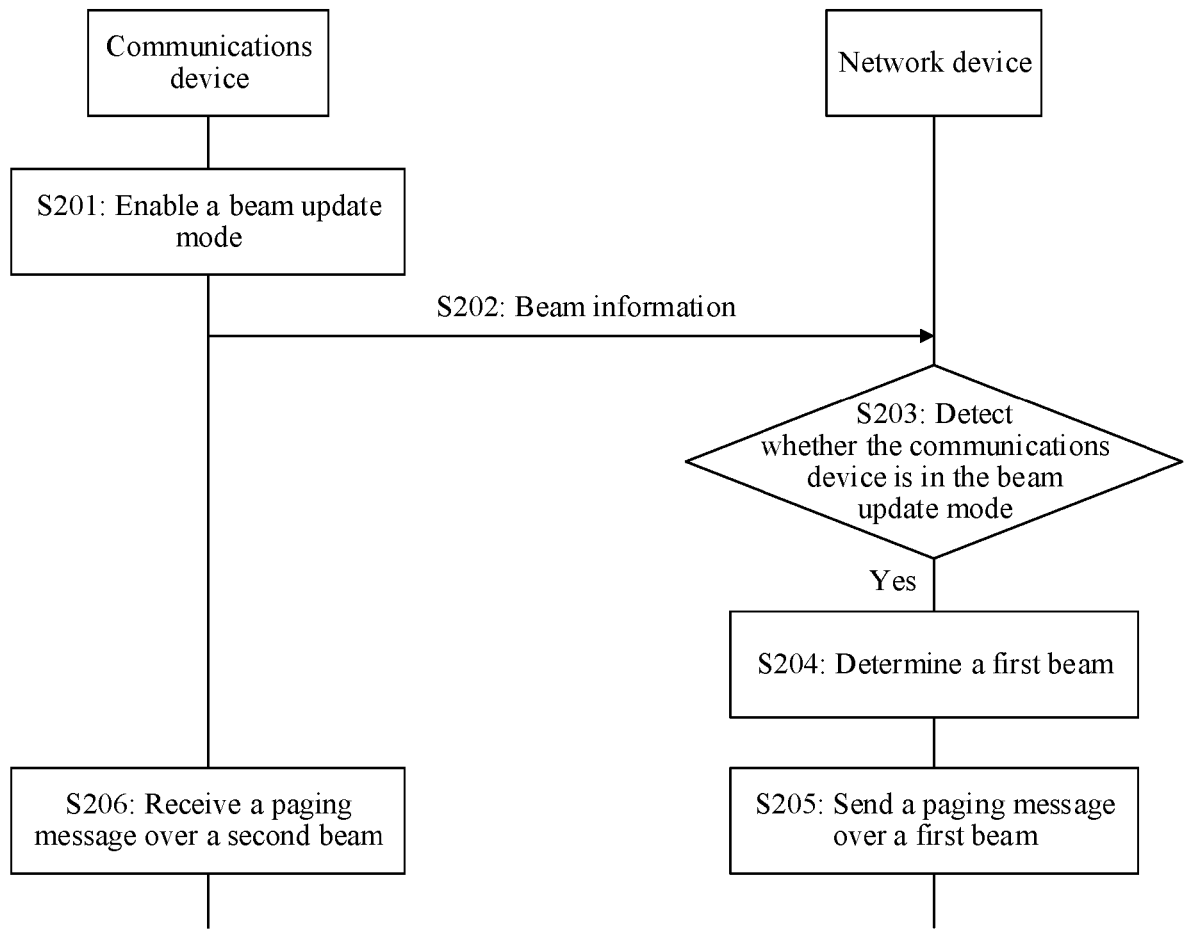
FIG. 4 is a flowchart of another paging message transmission method according to an embodiment of this application.

FIG. 4 shows another paging message transmission method according to an embodiment of this application. The method includes the following operations.

Operation S201: A communications device enables a beam update mode.

Operation S201 is similar to operation S101. For related descriptions, refer to the embodiment shown in FIG. 3. Details are not described again in this embodiment of this application.

Operation S202: The communications device reports beam information.

The beam information includes information about at least one transmit beam, and the information about the at least one transmit beam includes information about a first beam.

In this embodiment, the information about the transmit beam is used to indicate a transmit beam of a network device. The information about the transmit beam includes at least one of the following information: an index of the transmit beam (for example, a logical number or a physical number of the beam), a port number corresponding to a reference signal carried by the transmit beam, beam pair link BPL) information, an index of a synchronization signal block (SSB), and the like.

In an embodiment, the communications device reports the beam information to the network device when a fourth preset condition is met.

It is noteworthy that a premise for the communications device to report the beam information is that the communications device has generated the beam information. The communications device may generate the beam information by using the following method:

Method 1: The communications device detects signal strength of each transmit beam, and then the communications device generates the beam information based on information about a transmit beam that meets a preset rule. The signal strength of the transmit beam includes reference signal received power (RSRP) and/or reference signal received quality (RSRQ) of a reference signal.

In one embodiment, the preset rule includes the following: The signal strength of the transmit beam is greater than a preset value, or the transmit beam is ranked among top n beams in terms of signal strength, where n is a natural number. The preset rule may be alternatively implemented in another manner. This is not limited in any manner in this embodiment of this application.

Method 2: The communications device detects received signal quality of each receive beam, and determines a receive beam that meets a preset rule. Then the communications device determines, based on pre-stored beam pair information, a transmit beam corresponding to the receive beam that meets the preset rule. Finally, the communications device generates the beam information based on information about the transmit beam corresponding to the receive beam that meets the preset rule.

It is noteworthy that the beam pair information includes a correspondence between a transmit beam of the network device and a receive beam of the communications device. In one embodiment, the beam pair information is sent to the communications device by the network device.

In one embodiment, the preset rule includes the following: Received signal quality of the receive beam is greater than a preset value, or the receive beam is ranked among top n beams in terms of received signal quality, where n is a natural number. The preset rule may be alternatively implemented in another manner. This is not limited in any manner in this embodiment of this application.

Certainly, the communications device may alternatively generate the beam information by using another method. This is not limited in any manner in this embodiment of this application.

Operation S203: The network device detects whether the communications device is in the beam update mode.

Operation S203 is similar to operation S103. For related descriptions, refer to the embodiment shown in FIG. 3. Details are not described again in this embodiment of this application.

Operation S204: The network device determines a first beam based on the beam information.

In an optional implementation, the network device determines the first beam based on the beam information by using a preset method.

It is noteworthy that the preset method is used by both the network device and the communications device. In other words, the communications device also determines the first beam by using the preset method.

For example, the communications device and the network device select a transmit beam with greatest signal strength in the beam information as the first beam.

The following describes, in combination with specific application scenarios, how the network device and the communications device determine the first beam.

Scenario 1: The beam information includes the information about the at least one transmit beam and signal strength of the at least one transmit beam. In this case, the network device determines the first beam based on information about a transmit beam with greatest signal strength. Likewise, the communications device compares signal strength of the plurality of transmit beams, and determines the first beam based on the information about the transmit beam with the signal strength.

Scenario 2: The beam information includes the information about the at least one transmit beam and a priority of the at least one transmit beam. In this case, the network device determines the first beam based on information about a transmit beam with a highest priority. Likewise, the communications device determines the first beam based on the information about the transmit beam with the highest priority.

In one embodiment, the priority is determined based on signal strength of the transmit beam. It can be understood that a transmit beam with a higher priority has greater signal strength.

Certainly, determining the first beam by the network device and the communications device may be alternatively implemented in another manner. This is not limited in any manner in this embodiment of this application.

Operation S205: The network device sends a paging message to the communications device over the first beam.

It can be understood that the first beam is a transmit beam used by the network device in a process of sending the paging message.

Specifically, when the network device is a base station, the base station sends the paging message to the communications device over the first beam. Alternatively, when the network device is an MME, the MME sends the paging message and information about the first beam to a base station, so that the base station forwards the paging message to the communications device over the first beam.

Operation S206: The communications device receives the paging message over a second beam.

The second beam and the first beam belong to a same beam pair. In other words, the second beam corresponds to the first beam. It can be understood that the second beam is a receive beam used by the communications device in a process of receiving the paging message.

In an optional implementation, after reporting the beam information, the communications device determines the first beam by using the preset method in operation S204. After determining the first beam, the communications device determines the second beam based on the pre-stored beam pair information. The beam pair information includes a correspondence between a transmit beam of the network device and a receive beam of the communications device. In one embodiment, the beam pair information is sent to the communications device by the network device. Then the communications device receives the paging message over the second beam.

In one embodiment, when the concept of beam pair is not considered, the first beam and the second beam may be collectively referred to as a downlink beam. Therefore, the foregoing operation S205 is equivalent to that "the network device sends a paging message to the communications device over the downlink beam". The foregoing operation S206 is equivalent to that "the communications device receives the paging message over the downlink beam". However, when the concept of beam pair is considered, for the network device, the foregoing downlink beam is the first beam; and for the communications device, the foregoing downlink beam is the second beam.

The actions in the foregoing operations S201, S202, and S206 may be performed by the processor 301 in the communications device 30 shown in FIG. 2 by calling the application program code stored in the memory 302; and the actions in the foregoing operations S203 to S205 may be performed by the processor 201 in the network device 20 shown in FIG. 2 by calling the application program code stored in the memory 202. This is not limited in any manner in this embodiment of this application.

The foregoing mainly describes, from a perspective of interaction between the communications device and the network device, the solutions provided in the embodiments of this application. It can be understood that, to implement the foregoing functions, the communications device and the network device include a corresponding hardware structure and/or software module for implementing each function. A person skilled in the art should easily be aware that, in combination with units and algorithm operations of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In an embodiment of this application, the communications device and the network device may be divided according to the foregoing method examples. For example, modules or units may be obtained through division based on functions, or two or more functions may be integrated into one processing module. The foregoing integrated module may be implemented in a form of hardware, or may be implemented in a form of a software module or unit. In this embodiment of this application, module or unit division is illustrative, and is merely logical function division. In actual implementation, another division manner may be used.

Figure 5:
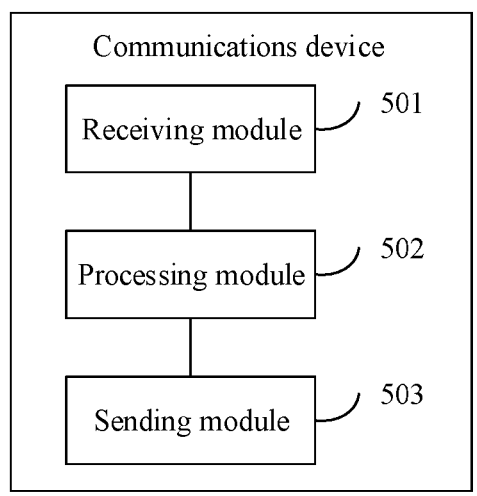
FIG. 5 is a first schematic structural diagram of a communications device according to an embodiment of this application.

For example, when function modules are obtained through division based on functions, FIG. 5 is a possible schematic structural diagram of the communications device in the foregoing embodiments. As shown in FIG. 5, the communications device includes a receiving module 501, a processing module 502, and a sending module 503. The communications device may perform the following action 1 or action 2.

Action 1: The sending module 503 is configured to report beam information, where the beam information includes information about at least one receive beam, and the information about the at least one receive beam includes information about a second beam. The receiving module 501 is configured to receive a paging message over the second beam.

Action 2: The sending module 503 is configured to report beam information, where the beam information includes information about at least one transmit beam, and the information about the at least one transmit beam includes information about a first beam. The receiving module 501 is configured to receive a paging message over a second beam, where the second beam corresponds to the first beam.

In one embodiment, the processing module 502 is configured to enable the beam update mode when a first preset condition is met.

The first preset condition includes at least one or any combination of the following:

(1-1) a best receive beam of the communications device does not change within preset duration, where the best receive beam is a receive beam with best received signal quality;

(1-2) frequency at which the best receive beam of the communications device changes is less than or equal to first preset frequency; and (1-3) the communications device has received a first indication message sent by a network device, where the first indication message is used to instruct the communications device to enable the beam update mode.

In one embodiment, the processing module 502 is further configured to exit the beam update mode when a second preset condition is met.

The second preset condition includes at least one or any combination of the following:

(2-1) the communications device executes a low-latency service, where the low-latency service is a service that requires a latency to be lower than a preset value;

(2-2) frequency at which the best receive beam of the communications device changes is greater than or equal to second preset frequency; and (2-3) the communications device has received a second indication message sent by the network device, where the second indication message is used to instruct the communications device to exit the beam update mode.

In this embodiment of this application, the apparatus is presented in a form in which the function modules are obtained through division based on functions, or the apparatus may be presented in a form in which function modules are divided in an integrated manner. A "module" herein may include an application-specific integrated circuit (ASIC), a circuit, a memory and a processor that executes one or more software or firmware programs, an integrated logic circuit, or another component that can provide the foregoing functions. In a simple embodiment, a person skilled in the art can figure out that the communications device may be implemented by the communications device shown in FIG. 2. For example, the receiving module 501 and the sending module 503 in FIG. 5 may be implemented by the communications interface 303 in FIG. 2, and the processing module 502 may be implemented by the processor 301 in FIG. 2. This is not limited in any manner in this embodiment of this application.

Figure 6:
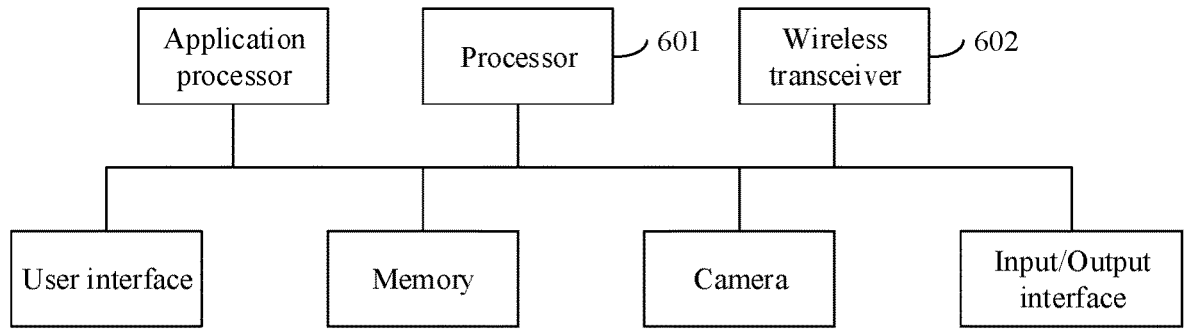
FIG. 6 is a second schematic structural diagram of a communications device according to an embodiment of this application.

FIG. 6 shows another implementation form of a communications device. The communications device includes a processor 601, an application processor, a memory, a user interface, a camera, an input/output interface, a wireless transceiver 602, and some other elements (including a device such as a power source that is not shown). In FIG. 6, the processor 601 completes the function of the foregoing processing module 502, and the wireless transceiver 602 completes the functions/function of the foregoing receiving module 501 and/or sending module 503. It can be understood that the elements shown in the figure are merely illustrative but are not elements essential for implementing this embodiment. For example, the camera may be omitted, or the input/output interface may be integrated into a circuit rather than existing in a form of an independent element.

Figure 7:
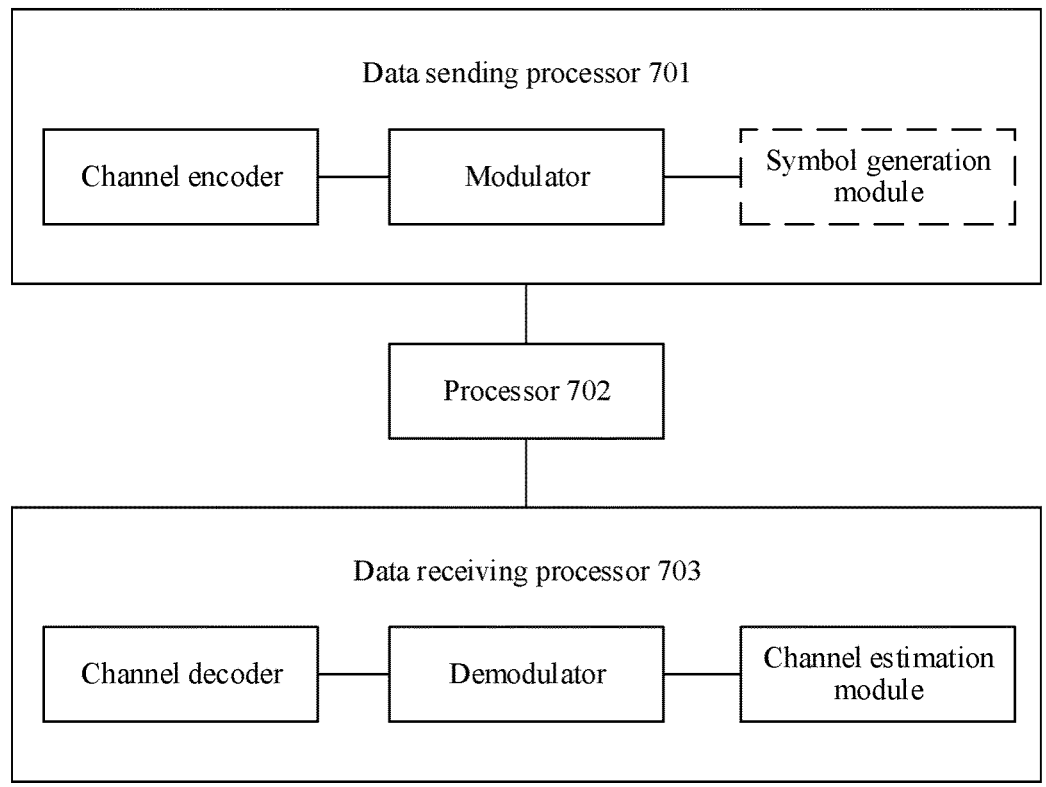
FIG. 7 is a third schematic structural diagram of a communications device according to an embodiment of this application.

FIG. 7 shows another implementation form of a communications device. The communications device includes a data sending processor 701, a processor 702, and a data receiving processor 703. In FIG. 7, the data sending processor 701 completes the function of the foregoing sending module 503, the processor 702 completes the function of the foregoing processing module 502, and the data receiving processor 703 completes the function of the foregoing receiving module 501. Although a channel encoder and a channel decoder are shown in FIG. 7, it can be understood that these modules do not constitute a limitative description of this embodiment, and are merely illustrative.

Figure 8:
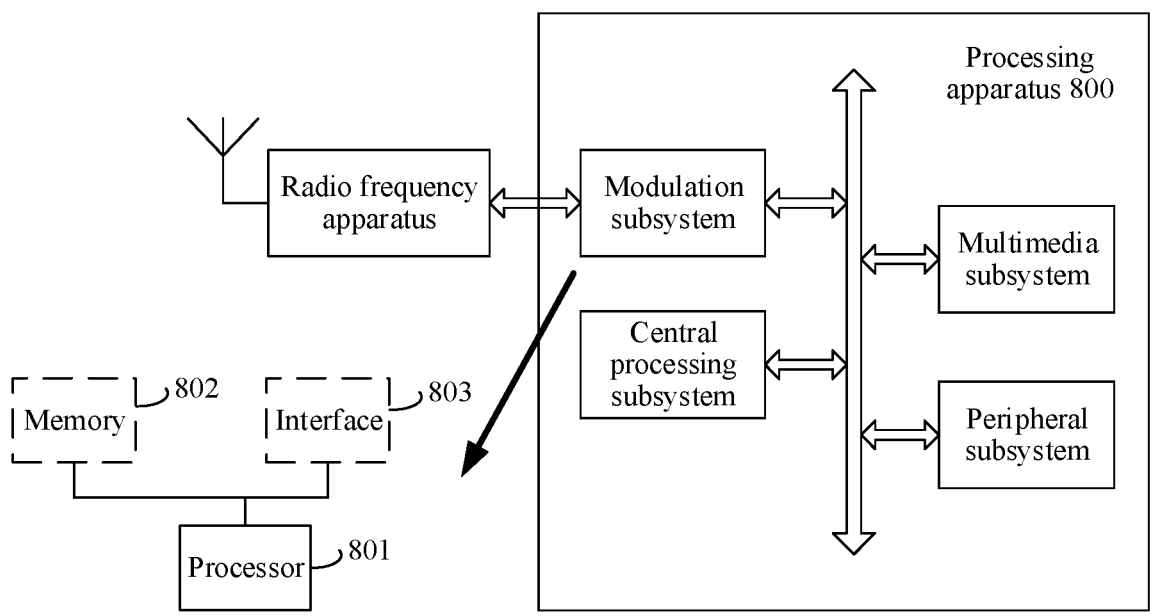
FIG. 8 is a fourth schematic structural diagram of a communications device according to an embodiment of this application.

FIG. 8 shows another implementation form of a communications device. A processing apparatus 800 includes modules such as a modulation subsystem, a central processing subsystem, and a peripheral subsystem. In this embodiment, the communications device may function as the modulation subsystem in the processing apparatus 800. Specifically, the modulation subsystem may include a processor 801 and an interface 803. The processor 801 completes the function of the foregoing processing unit 502, and the interface 803 completes the functions/function of the foregoing sending module 503 and/or receiving module 501. In another variation, the modulation subsystem includes a memory 802, a processor 801, and a program that is stored in the memory and that can run on the processor. When the processor executes the program, the paging message transmission method is implemented. It should be noted that the memory 802 may be non-volatile or may be volatile. The memory 802 may be located inside the modulation subsystem, or may be located in the processing apparatus 800, provided that the memory 802 can be connected to the processor 801.

The communications device provided in this embodiment can perform the foregoing paging message transmission method. Therefore, for a technical effect that the communications device can achieve, refer to the foregoing method embodiments. Details are not described herein again.

An embodiment of this application further provides a computer-readable storage medium. The computer-readable storage medium stores an instruction. When the computer-readable storage medium is run on the communications device shown in FIG. 5, the communications device is enabled to perform the paging message transmission methods shown in FIG. 3 and FIG. 4 of the embodiments of this application.

In one embodiment, an embodiment of this application provides a system-on-a-chip. The system-on-a-chip includes a processor, configured to support a communications device in implementing the methods shown in FIG. 3 and FIG. 4. In one embodiment, the system-on-a-chip further includes a memory. The memory is configured to store a program instruction and data necessary for the communications device. Certainly, alternatively, the memory may not be located in the system-on-a-chip. The system-on-a-chip may include a chip, or may include a chip and other discrete components. This is not specifically limited in this embodiment of this application.

Figure 9:
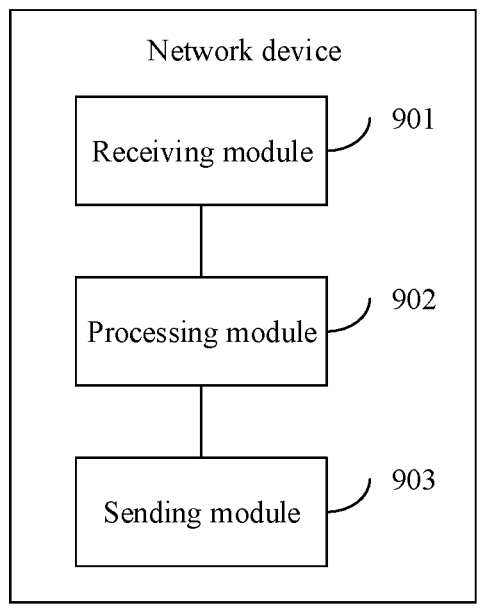
FIG. 9 is a first schematic structural diagram of a network device according to an embodiment of this application.

For example, when function modules are obtained through division based on functions, FIG. 9 is a possible schematic structural diagram of the network device in the foregoing embodiments. As shown in FIG. 9, the network device includes a receiving module 901, a processing module 902, and a sending module 903. The network device may perform the following action 3 or action 4.

Action 3: The processing module 902 is configured to determine that a communications device is in a beam update mode. The processing module 902 is further configured to determine a second beam based on beam information, where the beam information is reported by the communications device, the beam information includes information about at least one receive beam, and the information about the at least one receive beam includes information about the second beam. The sending module 903 is configured to send a paging message to the communications device over a first beam, where the first beam corresponds to the second beam.

Action 4: The processing module 902 is configured to determine that a communications device is in a beam update mode. The processing module 902 is further configured to determine a first beam based on beam information, where the beam information is reported by the communications device, the beam information includes information about at least one transmit beam, and the information about the at least one transmit beam includes information about the first beam. The sending module 903 is configured to send a paging message to the communications device over the first beam.

In one embodiment, the processing module 902 is configured to: when a fifth preset condition is met, determine that the communications device is in the beam update mode.

The fifth preset condition includes at least one or any combination of the following:

(5-1) the network device has stored the beam information of the communications device;

(5-2) the network device determines that a timer has not expired, where the timer is used to indicate a validity period in which the communications device is in the beam update mode;

(5-3) the network device has received the beam information sent by the communications device;

(5-4) the network device has received a first request message sent by the communications device, where the first request message is used to request to enable the beam update mode;

(5-5) the network device has not received a second request message sent by the communications device, where the second request message is used to request to exit the beam update mode;

(5-6) the network device has not sent a second indication message to the communications device, where the second indication message is used to instruct the communications device to exit the beam update mode;

(5-7) the network device has not received a third request message sent by the communications device, where the third request message is used to request the network device to enable a beam sweeping mode; and (5-8) the network device has not sent a third indication message to the communications device, where the third indication message is used to notify the communications device that the network device has enabled the beam sweeping mode.

In one embodiment, the sending module 903 is further configured to: when the network device fails to page the communications device over the first beam, re-send the paging message to the communications device in the beam sweeping mode.

In one embodiment, the sending module 903 is further configured to: when a third preset condition is met, send the second indication message to the communications device, where the second indication message is used to instruct the communications device to exit the beam update mode.

The third preset condition includes at least one or any combination of the following:

(3-1) the network device determines that the communications device executes a low-latency service, where the low-latency service is a service that requires a latency to be lower than a preset value;

(3-2) the network device determines that the timer has expired, where the timer is used to indicate the validity period in which the communications device is in the beam update mode;

(3-3) the network device does not receive, in first preset duration, the beam information reported by the communications device;

(3-4) the network device fails to page the communications device; and (3-5) the network device has received the second request message sent by the communications device, where the second request message is used to request to exit the beam update mode.

In this embodiment of this application, the apparatus is presented in a form in which the function modules are obtained through division based on functions, or the apparatus may be presented in a form in which function modules are divided in an integrated manner. A "module" herein may include an application-specific integrated circuit (ASIC), a circuit, a memory and a processor that executes one or more software or firmware programs, an integrated logic circuit, or another component that can provide the foregoing functions. In a simple embodiment, a person skilled in the art can figure out that the network device may be implemented by the network device shown in FIG. 2. For example, the receiving module 901 and the sending module 903 in FIG. 9 may be implemented by the communications interface 203 in FIG. 2, and the processing module 902 may be implemented by the processor 201 in FIG. 2. This is not limited in any manner in this embodiment of this application.

Figure 10:
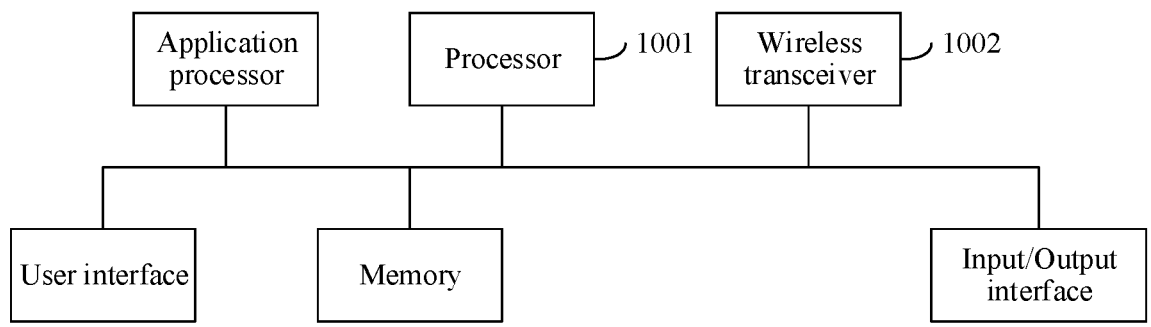
FIG. 10 is a second schematic structural diagram of a network device according to an embodiment of this application.

FIG. 10 shows another implementation form of a network device. The network device includes a processor 1001, an application processor, a memory, a user interface, an input/output interface, a wireless transceiver 1002, and some other elements (including a device such as a power source that is not shown). In FIG. 10, the processor 1001 completes the function of the foregoing processing module 902, and the wireless transceiver 1002 completes the functions/function of the foregoing receiving module 901 and/or sending module 903. It can be understood that the elements shown in the figure are merely illustrative but are not elements essential for implementing this embodiment. For example, the input/output interface may be integrated into a circuit rather than existing in a form of an independent element.

Figure 11:
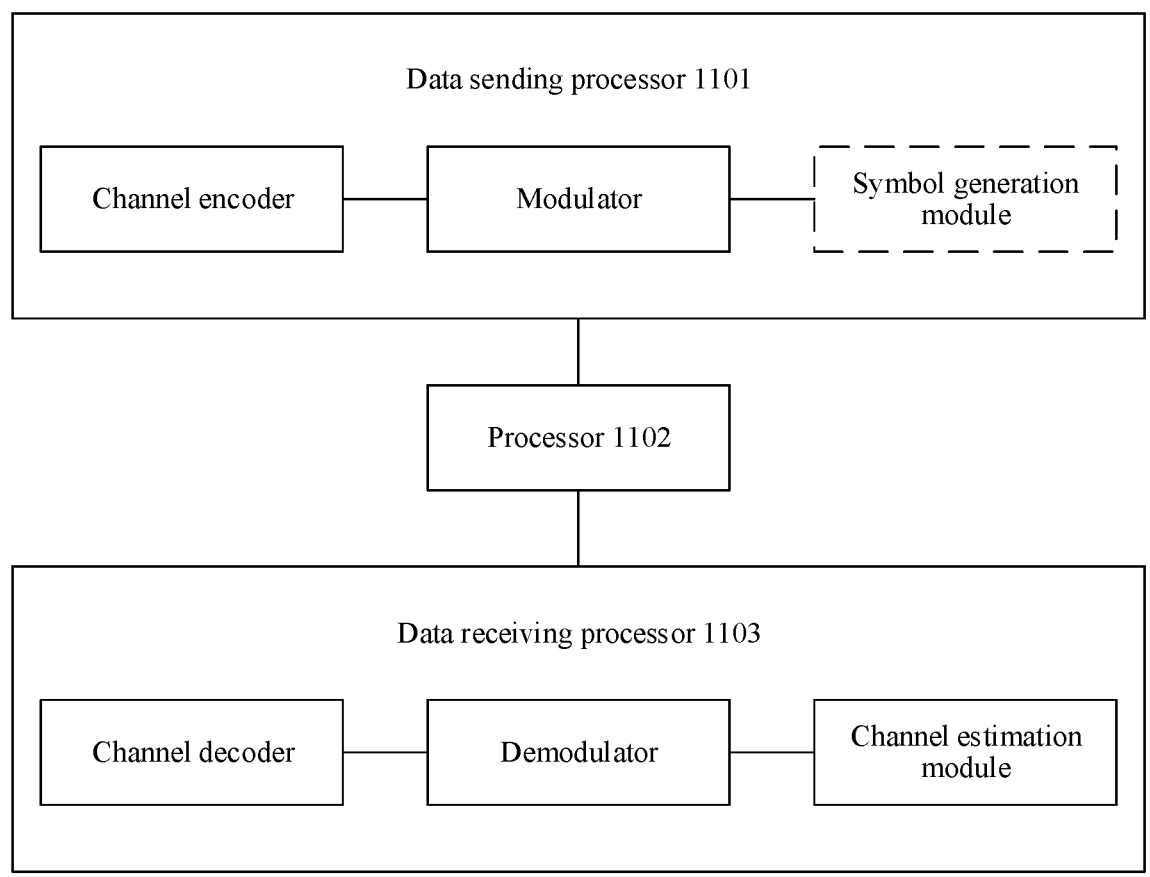
FIG. 11 is a third schematic structural diagram of a network device according to an embodiment of this application.

FIG. 11 shows another implementation form of a network device. The network device includes a data sending processor 1101, a processor 1102, and a data receiving processor 1103. In FIG. 11, the data sending processor 1101 completes the function of the foregoing sending module 903, the processor 1102 completes the function of the foregoing processing module 902, and the data receiving processor 1103 completes the function of the foregoing receiving module 901. Although a channel encoder and a channel decoder are shown in FIG. 11, it can be understood that these modules do not constitute a limitative description of this embodiment, and are merely illustrative.

Figure 12:
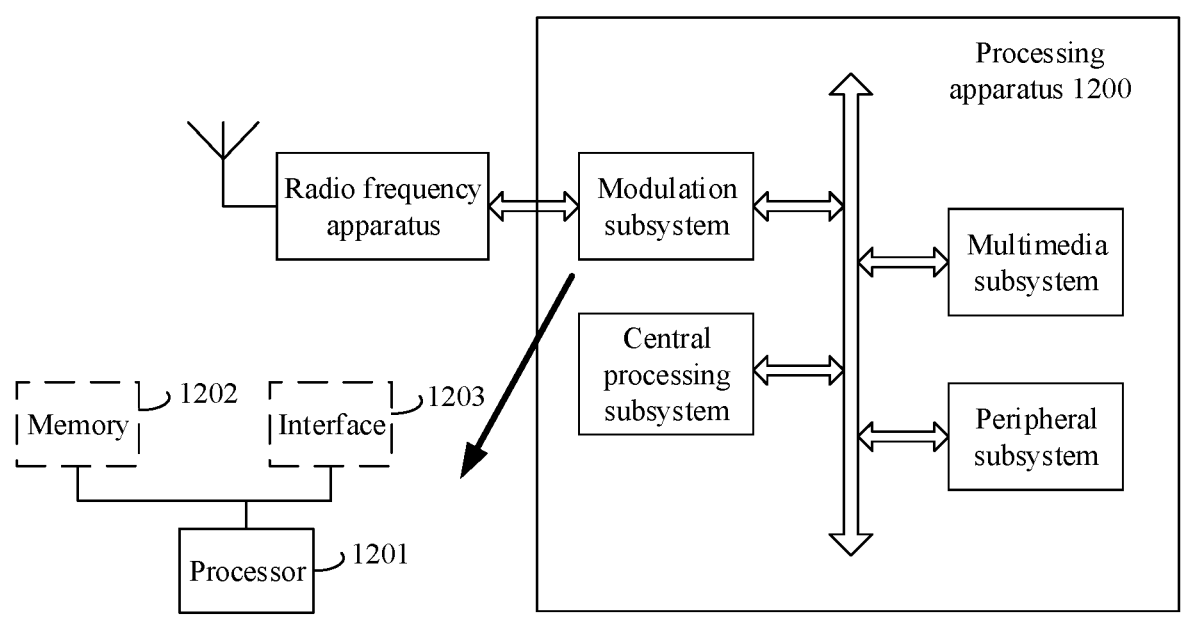
FIG. 12 is a fourth schematic structural diagram of a network device according to an embodiment of this application.

FIG. 12 shows another implementation form of a network device. A processing apparatus 1200 includes modules such as a modulation subsystem, a central processing subsystem, and a peripheral subsystem. In this embodiment, the network device may function as the modulation subsystem in the processing apparatus 1200. Specifically, the modulation subsystem may include a processor 1201 and an interface 1203. The processor 1201 completes the function of the foregoing processing unit 902, and the interface 1203 completes the functions/function of the foregoing sending module 903 and/or receiving module 901. In another variation, the modulation subsystem includes a memory 1202, a processor 1201, and a program that is stored in the memory and that can run on the processor. When the processor executes the program, the paging message transmission method is implemented. It should be noted that the memory 1202 may be non-volatile or may be volatile. The memory 1202 may be located inside the modulation subsystem, or may be located in the processing apparatus 1200, provided that the memory 1202 can be connected to the processor 1201.

The network device provided in this embodiment can perform the foregoing paging message transmission method. Therefore, for a technical effect that the network device can achieve, refer to the foregoing method embodiments. Details are not described herein again.

An embodiment of this application further provides a computer-readable storage medium. The computer-readable storage medium stores an instruction. When the computer-readable storage medium is run on the network device shown in FIG. 9, the network device is enabled to perform the paging message transmission methods shown in FIG. 3 and FIG. 4 of the embodiments of this application.

In one embodiment, an embodiment of this application provides a system-on-a-chip. The system-on-a-chip includes a processor, configured to support a network device in implementing the method shown in FIG. 3 and FIG. 4. In one embodiment, the system-on-a-chip further includes a memory. The memory is configured to store a program instruction and data necessary for the network device. Certainly, alternatively, the memory may not be located in the system-on-a-chip. The system-on-a-chip may include a chip, or may include a chip and other discrete components. This is not specifically limited in this embodiment of this application.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another operation, and "a" or "an" does not exclude a meaning of plurality. A single processor or another unit may implement several functions enumerated in the claims. Some measures are recorded in dependent claims that are different from each other, but this does not mean that these measures cannot be combined to produce a good effect.

Although this application is described with reference to specific features and the embodiments thereof, it is clear that, various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clear that, a person skilled in the art can make various modifications and variations to this application without departing from the spirit and scope of this application. This application is intended to cover these modifications and variations of this application provided that they fall within the scope defined by the claims of this application and their equivalent technologies.

What is claimed is:

1. A paging message transmission method, comprising:
   enabling, by a communications device, a beam update mode when a first preset condition is met;
   reporting, by the communications device, beam information, wherein the beam information comprises information about at least one receive beam, and the information about the at least one receive beam comprises information about a second beam; and
   receiving, by the communications device, a paging message over the second beam, wherein
   the first preset condition comprises at least one of the following:
   a best receive beam of the communications device does not change within a preset duration, wherein the best receive beam is a receive beam with a best received signal quality;
   a frequency at which the best receive beam of the communications device changes is less than or equal to a first preset frequency; or
   the communications device has received a first indication message sent by a network device, wherein the first indication message is used to indicate to the communications device to enable the beam update mode.

2. The paging message transmission method according to claim 1, wherein after the enabling, by the communications device, the beam update mode when the first preset condition is met, the method further comprises:
   exiting, by the communications device, the beam update mode when a second preset condition is met; wherein
   the second preset condition comprises at least one of the following:
   the communications device executes a low latency service;
   the frequency at which the best receive beam of the communications device changes is greater than or equal to a second preset frequency; and/or
   the communications device has received a second indication message sent by the network device, wherein the second indication message is used to indicate to the communications device to exit the beam update mode.

3. The paging message transmission method according to claim 1, wherein the beam information is reported when a fourth preset condition is met, wherein the fourth preset condition includes at least one of following conditions:
   the best receive beam of the communications device has changed; or
   the communications device does not report the beam information to the network device within a second preset duration.

4. The paging message transmission method according to claim 1, further comprising:
   detecting, by the communication device, a signal quality of a receive beam;
   generating, by the communication device, the beam information based on information about a receive beam that meets a preset rule.

5. The paging message transmission method according to claim 1, further comprising:
   detecting, by the communication device, a signal quality of a receive beam;
   determining, by the communication device, a receive beam that meets a preset rule;
   determining, based on pre-stored beam pair information, a transmit beam corresponding to the receive beam that meets the preset rule; and
   generating, by the communication device, the beam information based on information of the transmit beam corresponding to the receive beam that meets the preset rule.

6. The paging message transmission method according to claim 4, wherein the preset rule includes one of the following:
   a signal quality of the receive beam is greater than a preset value; or
   the receive beam is ranked among top n beams in terms of signal quality, where n is a natural number.

7. A paging message transmission method, comprising:
   enabling, by a communications device, a beam update mode when a first preset condition is met;
   reporting, by the communications device, beam information, wherein the beam information comprises information about at least one transmit beam, and the information about the at least one transmit beam comprises information about a first beam; and receiving, by the communication device, a paging message over a second beam, wherein the second beam corresponds to the first beam, wherein the first preset condition comprises at least one of the following:

a best receive beam of the communications device does not change within a preset duration, wherein the best receive beam is a receive beam with a best received signal quality;

a frequency at which the best receive beam of the communications device changes is less than or equal to a first preset frequency; or the communications device has received a first indication message sent by a network device, wherein the first indication message is used to indicate to the communications device to enable the beam update mode.

8. The paging message transmission method according to claim 7, wherein after the enabling, by the communications device, a beam update mode when a first preset condition is met, the method further comprises:

exiting, by the communications device, the beam update mode when a second preset condition is met; wherein the second preset condition comprises at least one of the following:

the communications device executes a low latency service, wherein the low latency service is a service that requires a latency to be lower than a preset value;

the frequency at which the best receive beam of the communications device changes is greater than or equal to a second preset frequency; and/or the communications device has received a second indication message sent by the network device, wherein the second indication message is used to indicate to the communications device to exit the beam update mode.

9. The paging message transmission method according to claim 7, wherein the beam information is reported when a fourth preset condition is met, wherein the fourth preset condition includes at least one of following conditions:

the best receive beam of the communications device has changed; or the communications device does not report the beam information to the network device within a second preset duration.

10. The paging message transmission method according to claim 7, further comprising:

detecting, by the communication device, a signal quality of a receive beam;

generating, by the communication device, the beam information based on information of a receive beam that meets a preset rule.

11. The paging message transmission method according to claim 7, further comprising:

detecting, by the communication device, a signal quality of a receive beam;

determining, by the communication device, a receive beam that meets a preset rule;

determining, based on pre-stored beam pair information, a transmit beam corresponding to the receive beam that meets the preset rule; and generating, by the communication device, the beam information based on information of the transmit beam corresponding to the receive beam that meets the preset rule.

12. The paging message transmission method according to claim 10, wherein the preset rule includes one of the following:

a signal quality of the receive beam is greater than a preset value; or the receive beam is ranked among top n beams in terms of signal quality, where n is a natural number.

13. A communications device, comprising:

a transmitter, configured to report beam information, wherein the beam information comprises information about at least one receive beam, and the information about the at least one receive beam comprises information about a second beam;

a receiver, configured to receive a paging message over the second beam; and a processor, configured to enable a beam update mode when a first preset condition is met, wherein the first preset condition comprises at least one of the following:

a best receive beam of the communications device does not change within a preset duration, wherein the best receive beam is a receive beam with a best received signal quality;

a frequency at which the best receive beam of the communications device changes is less than or equal to a first preset frequency; or the communications device has received a first indication message sent by a network device, wherein the first indication message is used to indicate to the communications device to enable the beam update mode.

14. The communications device according to claim 13, wherein the processor is further configured to exit the beam update mode when a second preset condition is met; wherein the second preset condition comprises at least one of the following:

the communications device executes a low latency service;

the frequency at which the best receive beam of the communications device changes is greater than or equal to a second preset frequency; and the communications device has received a second indication message sent by the network device, wherein the second indication message is used to indicate to the communications device to exit the beam update mode.

15. The communications device according to claim 13, wherein the beam information is reported when a fourth preset condition is met, wherein the fourth preset condition includes at least one of following conditions:

the best receive beam of the communications device has changed; or the communications device does not report the beam information to the network device within a second preset duration.

16. The communications device according to claim 13, wherein the processor is further configured to:

detect a signal quality of a receive beam;

generate the beam information based on information about a receive beam that meets a preset rule.

17. The communications device according to claim 13, wherein the processor is further configured to:

detect a signal quality of a receive beam;

determine a receive beam that meets a preset rule;

determine, based on pre-stored beam pair information, a transmit beam corresponding to the receive beam that meets the preset rule; and generate the beam information based on information of the transmit beam corresponding to the receive beam that meets the preset rule.

18. The communications device according to claim 16, wherein the preset rule includes one of the following:
   a signal quality of the receive beam is greater than a preset value; or
   the receive beam is ranked among top n beams in terms of signal quality, where n is a natural number.

* * * * *